(12) United States Patent
Tamaizumi et al.

(10) Patent No.: US 9,272,730 B2
(45) Date of Patent: Mar. 1, 2016

(54) ELECTRIC POWER STEERING SYSTEM

(71) Applicant: JTEKT CORPORATION, Osaka-shi, Osaka (JP)

(72) Inventors: Terutaka Tamaizumi, Okazaki (JP); Masayuki Kita, Okazaki (JP); Isao Namikawa, Okazaki (JP); Hirozumi Eki, Okazaki (JP)

(73) Assignee: JTEKT CORPORATION, Osaka (JP)

( * ) Notice: Subject to any disclaimer, the term of this patent is extended or adjusted under 35 U.S.C. 154(b) by 18 days.

(21) Appl. No.: 14/463,051

(22) Filed: Aug. 19, 2014

(65) Prior Publication Data

US 2015/0057890 A1    Feb. 26, 2015

(30) Foreign Application Priority Data

Aug. 26, 2013    (JP) ................. 2013-174699

(51) Int. Cl.
*B62D 6/00*      (2006.01)
(52) U.S. Cl.
CPC ...................... *B62D 6/008* (2013.01)
(58) Field of Classification Search
CPC ........... B62D 6/008; B62D 5/04; G05D 17/02
See application file for complete search history.

(56) References Cited

U.S. PATENT DOCUMENTS

| | | | | |
|---|---|---|---|---|
| 6,079,513 A * | 6/2000 | Nishizaki | ................ | B62D 5/006 180/402 |
| 6,705,424 B2 * | 3/2004 | Ogawa | ................... | B62D 1/163 180/444 |
| 6,968,920 B2 * | 11/2005 | Barton | .................. | B60T 8/1764 180/443 |
| 7,004,278 B2 * | 2/2006 | Sugitani | ................. | B62D 6/008 180/402 |
| 7,191,864 B2 * | 3/2007 | Sugitani | ................. | B62D 6/008 180/402 |
| 7,966,114 B2 * | 6/2011 | Yamazaki | .............. | B62D 6/008 180/443 |
| 8,055,409 B2 * | 11/2011 | Tsuchiya | ............... | B62D 1/286 701/1 |
| 8,200,393 B2 * | 6/2012 | Kato | ...................... | B62D 5/008 180/412 |
| 8,548,681 B2 * | 10/2013 | Kushiro | ................. | B62D 6/007 137/625.23 |
| 9,051,004 B2 * | 6/2015 | Tamaizumi | .......... | B62D 5/0463 |
| 2006/0006021 A1 | 1/2006 | Takimoto et al. | | |
| 2013/0311044 A1 | 11/2013 | Tamaizumi et al. | | |

FOREIGN PATENT DOCUMENTS

| | | |
|---|---|---|
| DE | 10 2005 032037 A1 | 2/2006 |
| JP | B2-4453012 | 4/2010 |
| WO | 2012/133590 A1 | 10/2012 |

OTHER PUBLICATIONS

May 6, 2015 Extended European Search Report issued in European Application No. 14181620.7.

* cited by examiner

*Primary Examiner* — Nicholas Kiswanto
(74) *Attorney, Agent, or Firm* — Oliff PLC

(57) ABSTRACT

In an electric power steering system, a vehicle reactive force model computes a correction spring reactive torque in such a manner that an elasticity component included in a steering reactive force is increased with an increase in a lateral acceleration. As the lateral acceleration increases, an increase in a basic drive torque is suppressed by a larger amount. By an amount by which the magnitude of the basic drive torque is suppressed, a target pinion angle computed by a target pinion angle computing unit decreases and a correction component for a basic assist component is decreased. A steering assist force is decreased, and a steering reactive force is increased with a decrease in the steering assist force. Thus, it is possible to obtain an appropriate steering reactive force based on the magnitude of the lateral acceleration.

4 Claims, 11 Drawing Sheets

F I G . 3
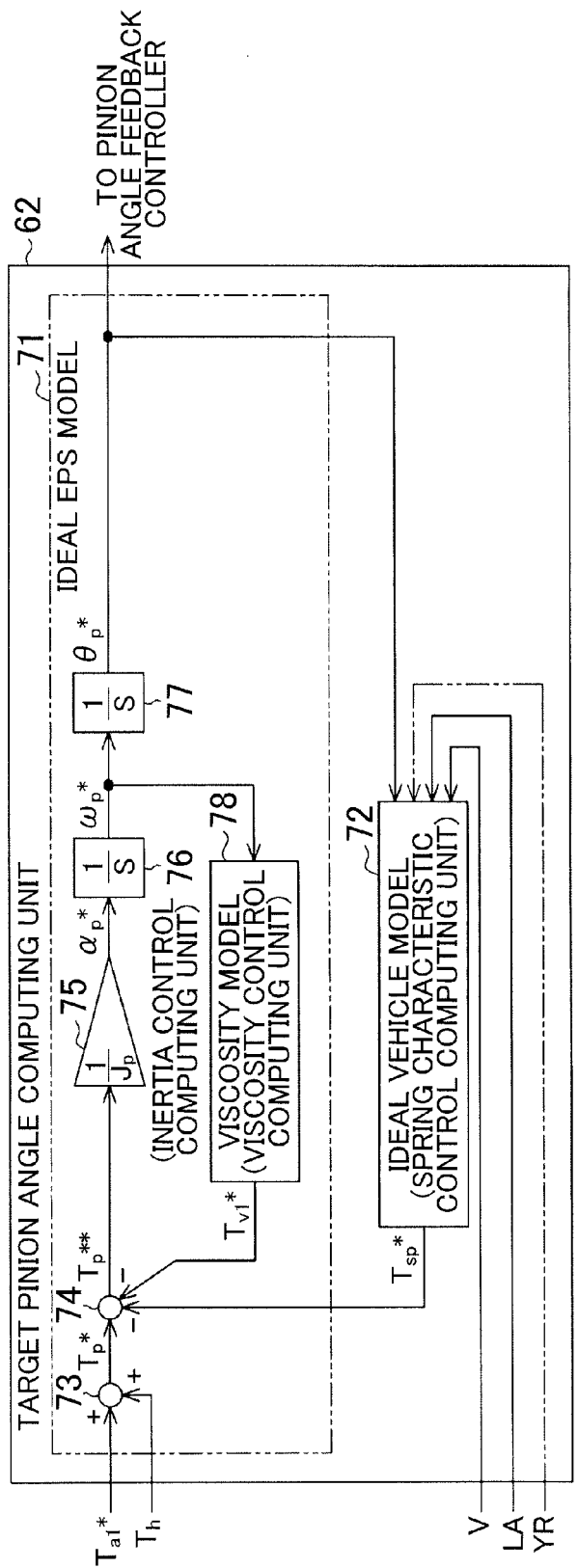

F I G . 5
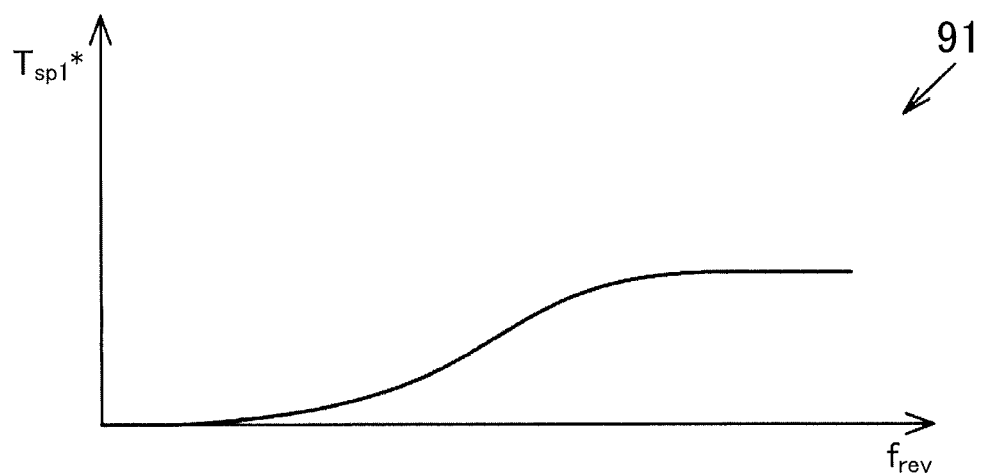

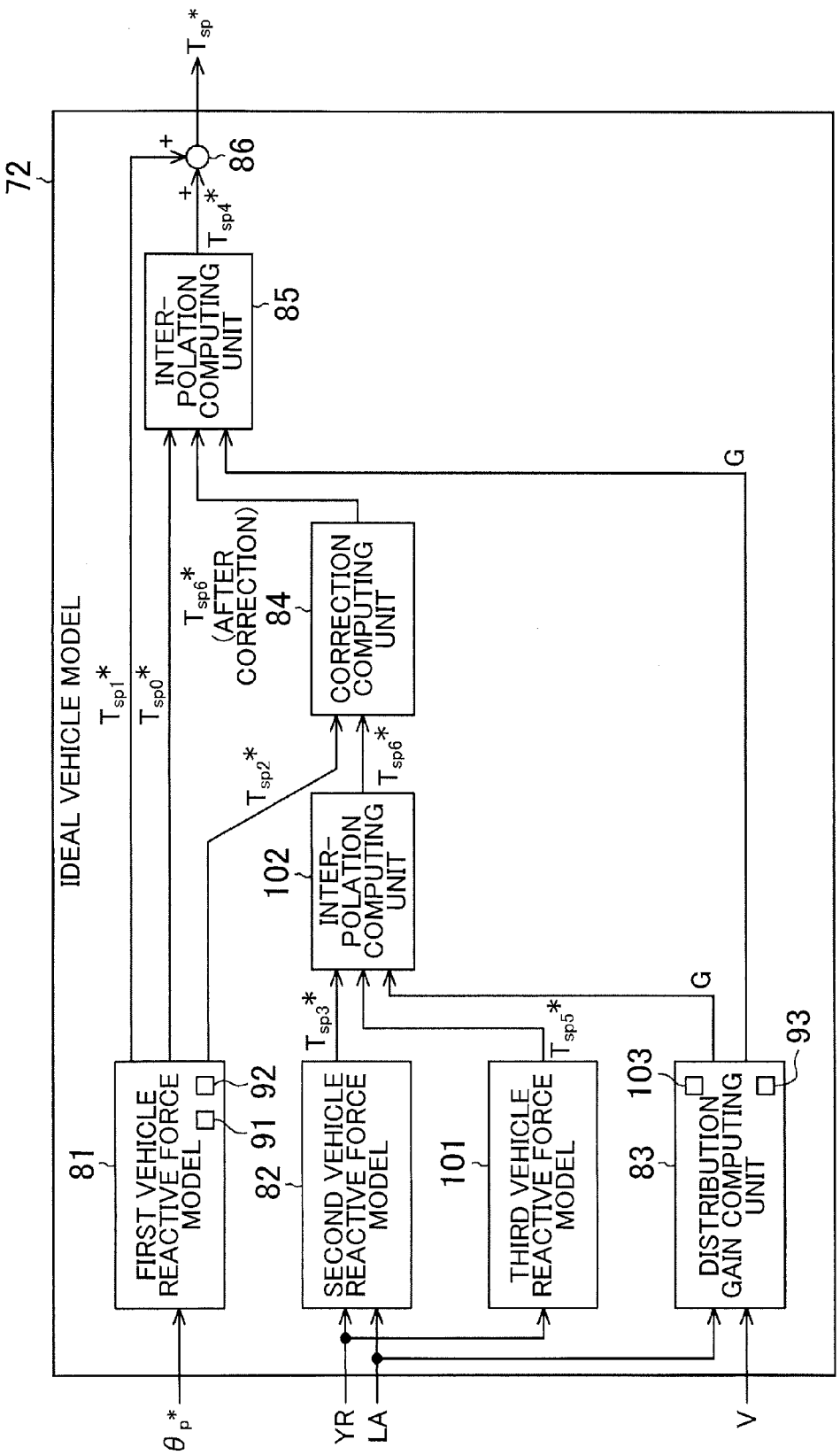

ELECTRIC POWER STEERING SYSTEM

INCORPORATION BY REFERENCE

The disclosure of Japanese Patent Application No. 2013-174699 filed on Aug. 26, 2013 including the specification, drawings and abstract is incorporated herein by reference in its entirety.

BACKGROUND OF THE INVENTION

1. Field of the Invention

The invention relates to an electric power steering system.

2. Description of Related Art

Conventionally, there is an electric power steering system (hereinafter, referred to as "EPS") that assists a driver's steering operation by supplying power generated by an electric motor to a steering mechanism of a vehicle. For example, a controller of an EPS described in Japanese Patent No. 4453012 controls an electric motor based on a steering torque, a steering angle, and a wheel steered angle acquired by various sensors.

The controller has first and second normative models (models in which the purpose of the control is formulated). The first normative model defines a relationship between a steering angle and a target steering torque. The second normative model defines a relationship between a steering torque and a target steered angle. The controller executes proportional-integral-derivative control (PID control) that is a kind of feedback control based on the target steering torque and the target steered angle that are respectively determined by the first and second normative models.

The controller computes a deviation of an actual steering torque from the target steering torque determined by the first normative model and a deviation of an actual steered angle from the target steered angle determined by the second normative model. Then, the controller controls the electric motor so as to eliminate the deviations. The controller controls the electric motor to cause the actual steering torque and the actual steered angle to follow the target steering torque and the target steered angle, respectively.

The second normative model defines the target steered angle that is an ideal steered angle corresponding to the steering torque. Through the feedback control of the steered angle executed based on the second normative model, it is possible to reliably obtain a rigid steering feel, but a driver's sense of unity with a vehicle may be insufficient depending on driving conditions. For example, when a steering wheel is turned largely, the driver senses a lateral acceleration corresponding to the operation amount of the steering wheel, but the response (steering reactive force) that the driver senses at his/her hands from the steering wheel does not change. This is because the steering reactive force corresponds only to the target steered angle defined by the second normative model. As a result, the driver may feel uncomfortable due to an imbalance between the magnitude of the lateral acceleration actually sensed by the driver's body and the response that the driver senses at his/her hands from the steering wheel.

SUMMARY OF THE INVENTION

One object of the invention is to provide an electric power steering system that provides a driver with a steering feel which corresponds to a lateral acceleration and with which the driver is more likely to feel a sense of unity with a vehicle.

An electric power steering system according to an aspect of the invention includes: a motor that is a source of generating steering assist force that is applied to a steering mechanism of a vehicle; and a controller that controls the motor in response to a vehicle steering operation. The controller includes: a first computing unit that computes a basic control component of the steering assist force to be applied to the steering mechanism based on a steering torque; and a second computing unit that computes a correction control component for the basic control component through feedback control for causing an actual rotation angle of a rotary shaft that rotates based on a steered angle of steered wheels to follow a target rotation angle computed based on the steering torque. The second computing unit decreases a magnitude of the steering torque used to compute the target rotation angle and then computes the correction control component, to increase a steering reactive force with an increase in a lateral acceleration applied to the vehicle.

According to the above aspect, the steering reactive force is increased based on the lateral acceleration applied to the vehicle through the correction of the basic control component with the correction control component. An increase in the magnitude of the steering torque used to compute the target pinion angle is suppressed. Then, the correction control component is obtained through the feedback control for causing the actual rotation angle to follow the target rotation angle that is computed based on the steering torque that is restrained from increasing. By an amount corresponding to suppression in an increase in the magnitude of steering torque, the target rotation angle computed by the computing unit is decreased, and the correction control component for the basic control component is decreased. By an amount of decrease in the correction control component, the steering assist force that is applied to the steering mechanism is decreased. As a result, the steering reactive force increases with a decrease in the steering assist force. Thus, it is possible to obtain an appropriate steering reactive force based on the magnitude of the lateral acceleration. It is thus possible to maintain a harmonious balance between the lateral acceleration sensed by the driver's body and the steering reactive force, that is, the response that the driver senses at his/her hands from the steering wheel.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein:

FIG. 3 is a control block diagram of a target pinion angle computing unit in the embodiment;

FIG. 5 is a graph indicating the relationship between a first correction spring reactive torque computed by a first vehicle reactive force model and a steering frequency in the embodiment;

FIG. 11 is a control block diagram of an ideal vehicle model according to another embodiment of the invention.

DETAILED DESCRIPTION OF EMBODIMENTS

Figure 1:
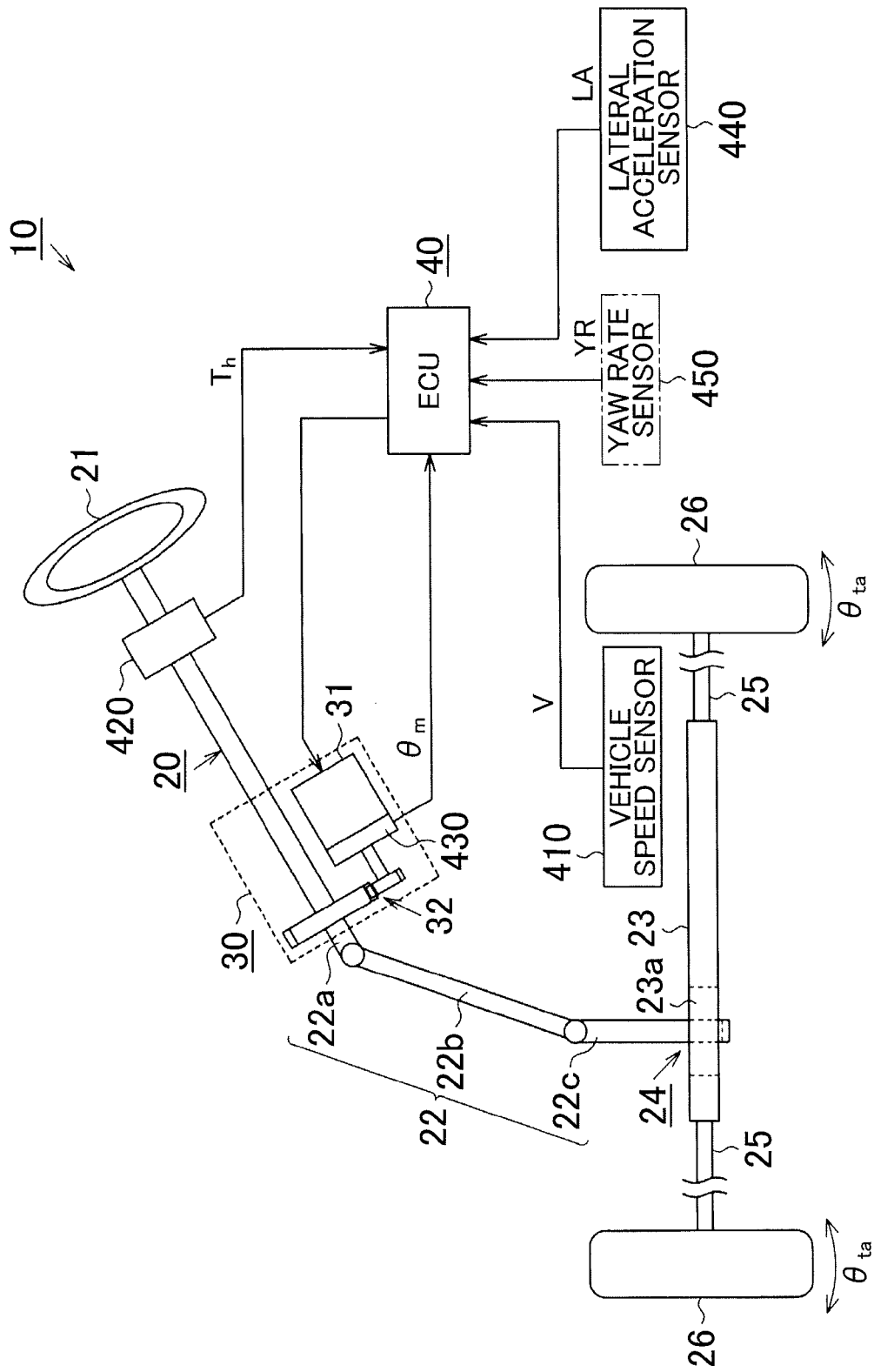
FIG. 1 is a block diagram illustrating the configuration of an electric power steering system according to an embodiment of the invention.
Figure 2:
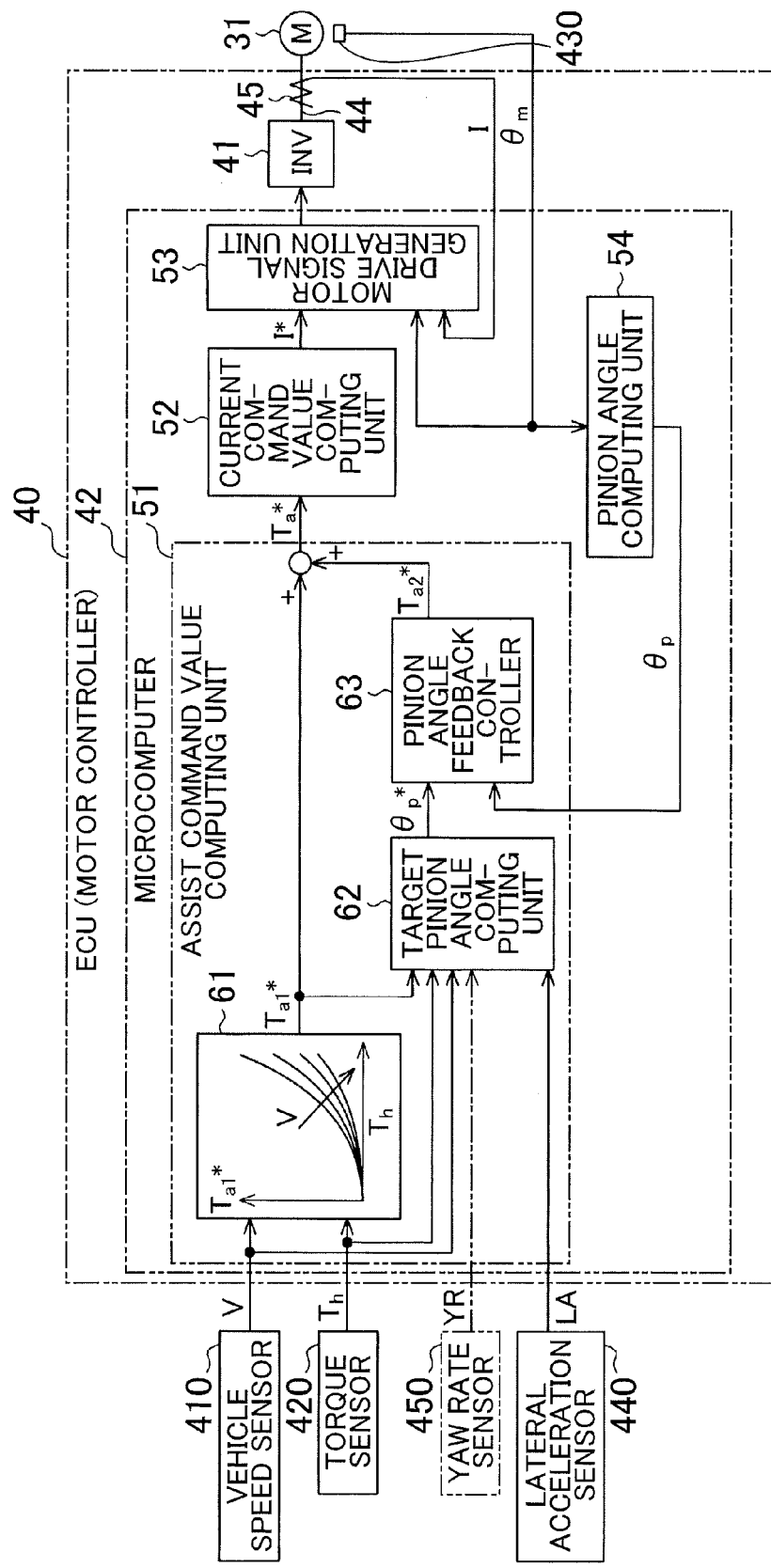
FIG. 2 is a control block diagram of a motor controller in the embodiment.

Hereinafter, an electric power steering system 10 for a vehicle according to an embodiment of the invention will be described with reference to FIG. 1 to FIG. 3. As illustrated in FIG. 1, the electric power steering system (EPS) 10 includes: a steering mechanism 20 that steers steered wheels in response to a driver's steering operation; a steering assist mechanism 30 that assists the driver's steering operation; and an electronic control unit (ECU) 40 that controls an operation of the steering assist mechanism 30.

The steering mechanism 20 includes a steering wheel 21 operated by a driver, and a steering shaft 22 that rotates together with the steering wheel 21. The steering shaft 22 includes: a column shaft 22a connected to the center of the steering wheel 21; an intermediate shaft 22b connected to a lower end portion of the column shaft 22a; and a pinion shaft 22c connected to a lower end portion of the intermediate shaft 22b. A lower end portion of the pinion shaft 22c is meshed with a rack toothed portion 23a of a rack shaft 23 that extends in a direction that intersects with the pinion shaft 22c. A rotary motion of the steering shaft 22 is converted into a linear reciprocating motion of the rack shaft 23 by a rack-and-pinion mechanism 24 including the pinion shaft 22c and the rack shaft 23. The linear reciprocating motion is transmitted to right and left steered wheels 26 via tie rods 25 respectively connected to opposite ends of the rack shaft 23, thereby changing a steered angle $\theta_{ta}$ of the steered wheels 26. Due to the change in the steered angle $\theta_{ta}$ of the steered wheels 26, the travelling direction of the vehicle is changed.

The steering assist mechanism 30 includes a motor 31 that is a source of generating steering assist force. A three-phase alternating current motor such as a brushless motor is used as the motor 31. The motor 31 is connected to the column shaft 22a via a speed reducer 32. The speed reducer 32 reduces the speed of rotation output from the motor 31, and transmits the rotation (torque) with a reduced speed to the column shaft 22a. The motor torque is applied, as the steering assist force, to the steering shaft 22, whereby a driver's steering operation is assisted.

The ECU 40 acquires detection results from various sensors installed in the vehicle, as information indicating driver's commands or a travelling state, and controls the motor 31 based on the acquired various information. The various sensors include, for example, a vehicle speed sensor 410, a torque sensor 420, a rotation angle sensor 430, and a lateral acceleration sensor 440. The vehicle speed sensor 410 detects a vehicle speed V that is a travelling speed of the vehicle. The torque sensor 420 is disposed on the column shaft 22a, and detects a steering torque $T_h$ applied to the steering shaft 22 via the steering wheel 21. The motor 31 is provided with the rotation angle sensor 430 that detects a rotation angle $\theta_m$ of the motor 31. The lateral acceleration sensor 440 detects a lateral acceleration LA applied to the vehicle. The lateral acceleration LA is an acceleration that acts in a lateral direction orthogonal to the travelling direction of the vehicle when the vehicle is seen from above. The ECU 40 controls the motor 31 based on the vehicle speed V, the steering torque $T_h$, the rotation angle $\theta_m$, and the lateral acceleration LA that are acquired from the sensors.

Subsequently, the hardware configuration of the ECU 40 will be described below. As illustrated in FIG. 2, the ECU 40 includes an inverter circuit 41 and a microcomputer 42.

The inverter circuit 41 converts direct current supplied from a direct-current power source such as a battery into three-phase alternating currents, based on a motor drive signal (described later) that is generated by the microcomputer 42. The obtained three-phase alternating currents are supplied to the motor 31 via three-phase power supply lines 44. A current sensor 45 is provided on each of the three-phase power supply lines 44. The current sensors 45 detect actual current values I, which are values of three-phase currents flowing through the power supply lines 44. In FIG. 2, for the purpose of convenience of explanation, the three-phase power supply lines 44 are collectively illustrated as one power supply line 44, and the three-phase current sensors 45 are collectively illustrated as one current sensor 45.

The microcomputer 42 acquires each of the detection results from the vehicle speed sensor 410, the torque sensor 420, the rotation angle sensor 430, and the current sensor 45 with a prescribed sampling period. The microcomputer 42 generates a PWM drive signal that is a motor drive signal, based on the acquired detection results, that is, the vehicle speed V, the steering torque $T_h$, the rotation angle $\theta_m$, and the current values I.

To be more precise, the microcomputer 42 executes motor current vector control by executing PWM driving with the use of the inverter circuit 41. In the vector control, a motor current is divided into a d-axis component (field current component) that is parallel to a magnetic field, and a q-axis component (torque current component) that is orthogonal to the d-axis component, and the divided current components are controlled independently of each other so as to be brought to target values. Due to the vector control, the motor 31 may be treated similarly to a direct-current motor.

The functional configuration of the microcomputer 42 will be described below. The microcomputer 42 has various computational processing units that are implemented by executing control programs stored in a storage unit (not illustrated). As illustrated in FIG. 2, the microcomputer 42 includes an assist command value computing unit 51, a current command value computing unit 52, a motor drive signal generation unit 53, and a pinion angle computing unit 54, as the computational processing units.

The assist command value computing unit 51 acquires the vehicle speed V, the steering torque $T_h$, the rotation angle $\theta_m$ of the motor 31, and a pinion angle $\theta_p$ (described later) that is computed by the pinion angle computing unit 54, and computes an assist command value $T_a^*$ based on the acquired various information. The assist command value $T_a^*$ is a command value indicating an assist torque that should be generated by the motor 31. The assist command value computing unit 51 will be described later.

The current command value computing unit 52 computes a current command value I* based on the assist command value $T_a^*$ computed by the assist command value computing unit 51. The current command value I* is a command value indicating a current that should be supplied to the motor 31. To be more precise, the current command value I* includes a q-axis current command value and a d-axis current command value in a d/q coordinate system. The d/q coordinate system is a rotating coordinate that follows the rotation angle $\theta_m$ of the motor 31.

The motor drive signal generation unit 53 acquires the current command value I*, the actual current values I, and the rotation angle $\theta_m$ of the motor 31, and executes current feedback control based on the acquired information such that the actual current values I follow the current command value I*. The motor drive signal generation unit 53 computes a deviation between the current command value I* and each actual current value I, and generates a motor drive signal so as to eliminate the deviation The motor drive signal generation unit 53 converts three-phase current values of the motor 31 into two-phase vector components, that is, the d-axis current value and the q-axis current value in the d/q coordinate system with the use of the rotation angle $\theta_m$. The motor drive signal generation unit 53 computes a deviation between the d-axis current value and the d-axis current command value, a deviation between the q-axis current value and the q-axis current command value, and then computes a PWM duty ratio for eliminating the deviations. A motor drive signal generated by the motor drive signal generation unit 53 includes the PWM duty ratio. A current corresponding to the motor drive signal is supplied to the motor 31 via the inverter circuit 41, whereby the motor 31 generates an assist torque corresponding to the assist command value $T_a^*$.

The pinion angle computing unit 54 acquires the rotation angle $\theta_m$ of the motor 31, and computes the pinion angle $\theta_p$ that is a rotation angle of the pinion shaft 22c based on the acquired rotation angle $\theta_m$. As described above, the motor 31 is connected to the column shaft 22a via the speed reducer 32. Thus, there is a correlation between the rotation angle $\theta_m$ of the motor 31 and the pinion angle $\theta_p$. It is possible to obtain the pinion angle $\theta_p$ from the rotation angle $\theta_m$ of the motor 31 based on the correlation. As described above, the pinion shaft 22c is meshed with the rack shaft 23. Thus, there is also a correlation between the pinion angle $\theta_p$ and the displacement of the rack shaft 23. That is, the pinion angle $\theta_p$ is a value that reflects the steered angle $\theta_{ta}$ of the steered wheel 26. The pinion angle $\theta_p$ is subjected to feedback control based on a target pinion angle $\theta_p^*$ (described later).

The assist command value computing unit 51 will be described in detail. As illustrated in FIG. 2, the assist command value computing unit 51 has a basic assist component computing unit 61, a target pinion angle computing unit 62, and a pinion angle feedback controller 63.

The basic assist component computing unit 61 computes a basic assist component $T_{a1}^*$ based on the vehicle speed V and the steering torque $T_h$. The basic assist component $T_{a1}^*$ is a basic control component of the assist command value $T_a^*$. The basic assist component computing unit 61 computes the basic assist component $T_{a1}^*$ with the use of a three-dimensional map that defines a relationship between the steering torque $T_h$ and the basic assist component $T_{a1}^*$ based on the vehicle speed V. The basic assist component computing unit 61 sets the absolute value of the basic assist component $T_{a1}^*$ to a larger value as the absolute value of the steering torque $T_h$ becomes larger, or as the vehicle speed V becomes lower.

The target pinion angle computing unit 62 acquires the basic assist component $T_{a1}^*$ computed by the basic assist component computing unit 61, and the steering torque $T_h$. The target pinion angle computing unit 62 has an ideal model that determines an ideal pinion angle based on a basic drive torque (input torque) that is the sum of the basic assist component $T_{a1}^*$ and the steering torque $T_h$. The ideal model is obtained in advance through, for example, an experiment, by modeling a pinion angle corresponding to an ideal steered angle based on the basic drive torque. The target pinion angle computing unit 62 computes a basic drive torque by adding together the basic assist component $T_{a1}^*$ and the steering torque $T_h$. The target pinion angle computing unit 62 computes the target pinion angle $\theta_p^*$ from the computed basic drive torque on the basis of the ideal model. The target pinion angle computing unit 62 acquires the vehicle speed V and a yaw rate YR, and takes into account the acquired vehicle speed V and the acquired yaw rate YR when computing the target pinion angle $\theta_p^*$. The target pinion angle computing unit 62 will be described later in detail.

The pinion angle feedback controller 63 acquires the target pinion angle $\theta_p^*$ computed by the target pinion angle computing unit 62, and the actual pinion angle $\theta_p$ computed by the pinion angle computing unit 54. The pinion angle feedback controller 63 executes PID control as feedback control of the pinion angle such that the actual pinion angle $\theta_p$ follows the target pinion angle $\theta_p^*$. That is, the pinion angle feedback controller 63 computes a deviation between the target pinion angle $\theta_p^*$ and the actual pinion angle $\theta_p$, and computes a correction component $T_{a2}^*$ (correction control component) for the basic assist component $T_{a1}^*$ so as to eliminate the deviation.

The assist command value computing unit 51 computes the assist command value $T_a^*$ by adding the correction component $T_{a2}^*$ to the basic assist component $T_{a1}^*$.

The target pinion angle computing unit 62 will be described in detail below. As described above, the target pinion angle computing unit 62 computes the target pinion angle $\theta_p^*$ from the basic drive torque that is the sum of the basic assist component $T_{a1}^*$ and the steering torque $T_h$ on the basis of the ideal model.

The ideal model is a model formulated using the fact that a torque applied to the steering shaft 22, that is, the basic drive torque $T_p^*$ is expressed by Expression (A) below.

$$T_p^* = J\theta_p^{*\prime\prime} + C\theta_p^{*\prime} + K\theta_p^* \tag{A}$$

where:
J is an inertia moment of the steering wheel 21 and the steering shaft 22;
C is a coefficient of viscosity (coefficient of friction) corresponding to, for example, a friction of the rack shaft 23 with respect to a housing; and
K is a coefficient of spring when each the steering wheel 21 and the steering shaft 22 is regarded as a spring.

As can be understood from Expression (A), the basic drive torque $T_p^*$ is obtained by adding together a value obtained by multiplying a second-order time differential value $\theta_p^{*\prime\prime}$ of the target pinion angle $\theta_p^*$ by the inertia moment J, a value obtained by multiplying a first-order time differential value $\theta_p^{*\prime}$ of the target pinion angle $\theta_p^*$ by the coefficient of viscosity C, and a value obtained by multiplying the target pinion angle $\theta_p^*$ by the coefficient of spring K.

The target pinion angle computing unit 62 computes the target pinion angle $\theta_p^*$ on the basis of the ideal model according to Expression (A). As illustrated in FIG. 3, the ideal model according to Expression (A) is divided into an ideal EPS model 71 and an ideal vehicle model 72.

The ideal EPS model 71 is tuned based on the characteristics of each of the components of the electric power steering system 10, such as the steering shaft 22 and the motor 31. The ideal EPS model 71 includes an adder 73, a subtractor 74, an inertia model 75, a first integrator 76, a second integrator 77, and a viscosity model 78.

The adder 73 computes the basic drive torque $T_p^*$ by adding together the basic assist component $T_{a1}^*$ and the steering torque $T_h$. The subtractor 74 subtracts a viscosity component $T_{vi}^*$ and a spring component $T_{sp}^*$ (both will be described later) from the basic drive torque $T_p^*$ computed by the adder 73. In this case, a subtraction value $T_p^{**}$ is a value obtained by subtracting the viscosity component $T_{vi}^*$ and the spring component $T_{sp}^*$ from the basic drive torque $T_p^*$.

The inertia model 75 functions as an inertia control computing unit that corresponds to an inertia term in Expression (A). The inertia model 75 computes a pinion angular acceleration $\alpha_p^*$ by multiplying the subtraction value $T_p^{**}$ computed by the subtractor 74 by a reciprocal of the inertia moment $J_p$.

The first integrator 76 computes a pinion angular velocity $\omega_p^*$ by integrating the pinion angular acceleration $\alpha_p^*$ computed by the inertia model 75. The second integrator 77 computes the target pinion angle $\theta_p^*$ by further integrating the pinion angular velocity $\omega_p^*$ computed by the first integrator 76. The target pinion angle $\theta_p^*$ is an ideal rotation angle of the pinion shaft 22c based on the ideal EPS model 71.

The viscosity model 78 functions as a viscosity control computing unit that corresponds to a viscosity term in Expression (A). The viscosity model 78 computes the viscosity component $T_{vi}^*$ of the basic drive torque $T_p^*$ by multiplying the pinion angular velocity $\omega_p^*$ computed by the first integrator 76 by the coefficient of viscosity C.

The ideal vehicle model 72 is tuned based on the characteristics of the vehicle in which the electric power steering system 10 is mounted. The characteristics of the vehicle, which exert influence on the steering characteristics, are determined by, for example, the design of each of a suspension and a wheel alignment and gripping force (frictional force) of the steered wheels 26. The ideal vehicle model 72 functions as a spring characteristic control computing unit that corresponds to a spring term in Expression (A). The ideal vehicle model 72 computes the spring component $T_{sp}^*$ of the basic drive torque $T_p^*$ by multiplying the target pinion angle $\theta_p^*$ computed by the second integrator 77 by the coefficient of spring K. The ideal vehicle model 72 takes into account the vehicle speed V and the yaw rate YR when computing the spring component $T_{sp}^*$.

With the target pinion angle computing unit 62 configured as described above, it is possible to directly tune the relationship between the basic drive torque $T_p^*$ and the target pinion angle $\theta_p^*$, thereby achieving desired steering characteristics, by adjusting the inertia moment J and the coefficient of viscosity C of the ideal EPS model 71 and by adjusting the coefficient of spring K of the ideal vehicle model 72.

In the present embodiment, the target pinion angle $\theta_p^*$ is set from the basic drive torque $T_p^*$ on the basis of the ideal EPS model 71 and the ideal vehicle model 72, and feedback control is executed such that the actual pinion angle $\theta_p$ coincides with the target pinion angle $\theta_p^*$. As described above, there is a correlation between the pinion angle $\theta_p$ and the steered angle $\theta_{ta}$ of each of the steered wheels 26. Thus, a steered motion of the steered wheels 26 based on the basic drive torque $T_p^*$ is determined by the ideal EPS model 71 and the ideal vehicle model 72. That is, a vehicle steering feel is determined based on the ideal EPS model 71 and the ideal vehicle model 72. Thus, it is possible to achieve a desired steering feel by adjusting the ideal EPS model 71 and the ideal vehicle model 72.

The actual steered angle $\theta_{ta}$ is maintained at the steered angle $\theta_{ta}$ corresponding to the target pinion angle $\theta_p^*$. Thus, it is also possible to suppress reverse input vibrations caused by an external disturbance such as road conditions or a braking operation. That is, even when vibrations are transmitted to the steering mechanism 20 via the steered wheels 26, the correction component $T_{a2}^*$ is adjusted such that the pinion angle $\theta_p$ coincides with the target pinion angle $\theta_p^*$. Thus, the actual steered angle $\theta_{ta}$ is maintained at the steered angle $\theta_{ta}$ corresponding to the target pinion angle $\theta_p^*$ determined by the ideal model. As a result, steering assist is performed in such a direction that the reverse input vibrations are cancelled out, so that transmission of the reverse input vibrations to the steering wheel 21 is suppressed.

As described above, the pinion angle feedback controller 63 executes feedback control of the pinion angle $\theta_p$ such that the actual pinion angle $\theta_p$ follows the target pinion angle $\theta_p^*$. Through the feedback control, it is possible to obtain a rigid steering feel, but a driver's sense of unity with a vehicle may be insufficient depending on driving conditions.

For example, when the lateral acceleration that is applied to the vehicle in association with a steering operation increases, the driver's body senses the lateral acceleration LA corresponding to the operation amount of the steering wheel 21, but the response (steering reactive force) that the driver senses at his/her hands from the steering wheel 21 does not change. This is because the steering reactive force corresponds only to the target pinion angle $\theta_p^*$ determined by the target pinion angle computing unit 62, irrespective of the lateral acceleration LA applied to the vehicle.

The balance between the lateral acceleration LA received by the driver's body and the steering reactive force sensed by the driver's hands is reflected in the driver's sense of unity with the vehicle while the driver is actually driving. When the driver feels that the lateral acceleration LA received by the driver's body and the steering reactive force sensed by the driver's hands are synchronized with each other and correspond to each other, the driver is likely to feel a sense of unity with the vehicle. Specifically, when the lateral acceleration increases, if the steering reactive force increases in accordance with the increase in the lateral acceleration, the driver is likely to feel a sense of unity with the vehicle.

If the steering reactive force remains unchanged although the lateral acceleration sensed by the driver's body has been increasing, the driver is less likely to feel a sense of unity with the vehicle due to an insufficient response that the driver senses at high/her hands from the steering wheel 21. The driver's sense of unity with the vehicle exerts influence also on the ease of driving. Therefore, the target pinion angle computing unit 62 in the present embodiment takes into account the lateral acceleration LA applied to the vehicle when computing the target pinion angle $\theta_p^*$ to improve the driver's sense of unity with the vehicle. Specifically, the lateral acceleration LA is taken into account when the spring component $T_{sp}^*$ of the basic drive torque $T_p^*$ is computed in the ideal vehicle model 72.

Figure 4:
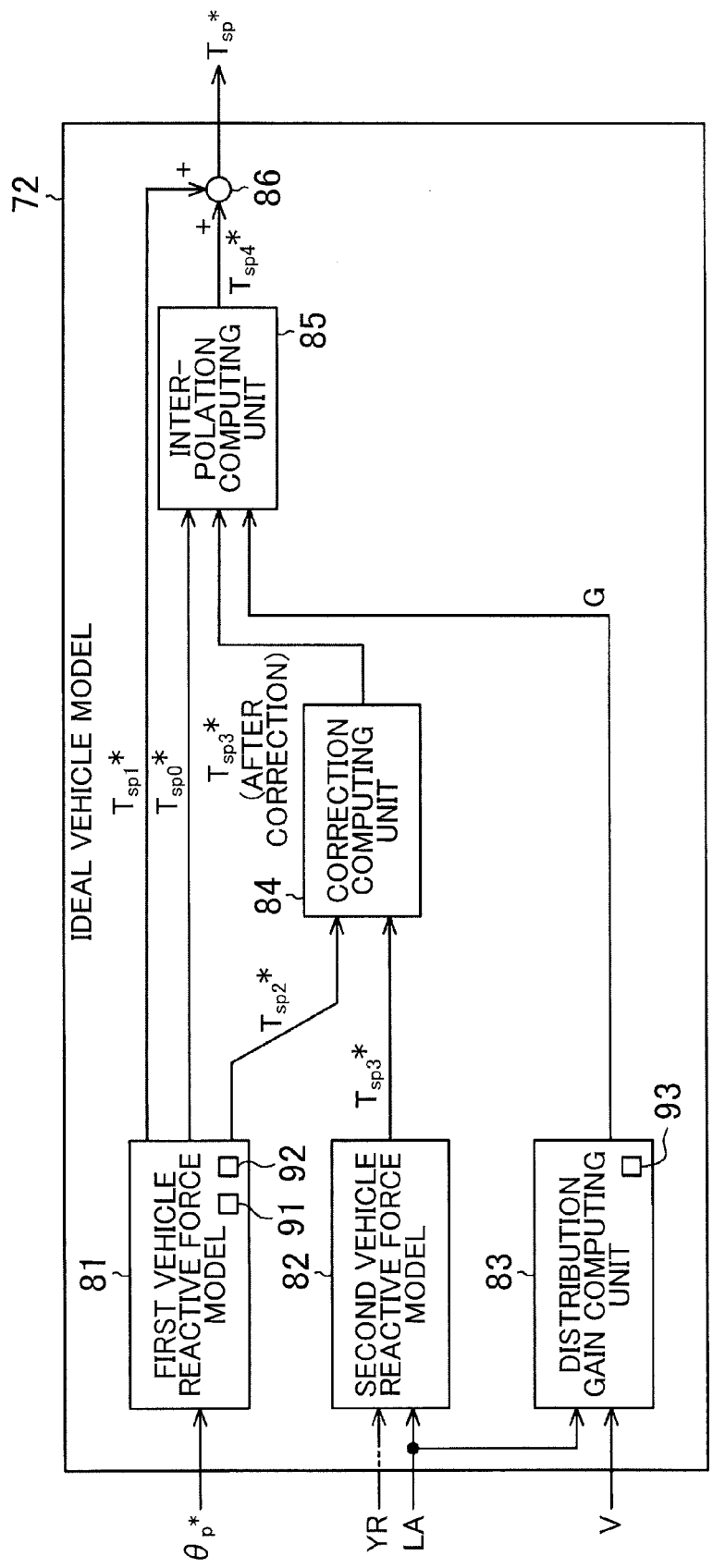
FIG. 4 is a control block diagram of an ideal vehicle model in the embodiment.

The ideal vehicle model 72 will be described in detail. As illustrated in FIG. 4, the ideal vehicle model 72 has a first vehicle reactive force model 81, a second vehicle reactive force model 82, a distribution gain computing unit 83, a correction computing unit 84, an interpolation computing unit 85, and an adder 86.

The first vehicle reactive force model 81 computes a basic spring reactive torque $T_{sp0}^*$. That is, the first vehicle reactive force model 81 acquires the target pinion angle $\theta_p^*$ computed by the second integrator 77, and computes the basic spring reactive torque $T_{sp0}^*$ corresponding to the target pinion angle $\theta_p^*$ by multiplying the acquired target pinion angle $\theta_p^*$ by the coefficient of spring K. The basic spring reactive torque $T_{sp0}^*$ is a basic component of the above-described spring component $T_{sp}^*$.

The first vehicle reactive force model 81 computes a first correction spring reactive torque $T_{sp1}^*$. The first correction spring reactive torque $T_{sp1}^*$ is an elasticity component for correcting the spring component $T_{sp}^*$ of the basic drive torque $T_p^*$ to a target steering characteristic. The spring component $T_{sp}^*$ is a final output from the ideal vehicle model 72. The first vehicle reactive force model 81 computes the first correction spring reactive torque $T_{sp1}^*$ corresponding to a steering frequency $f_{rev}$ based on a control map 91 that defines a relationship between the steering frequency $f_{rev}$ and the first correction spring reactive torque $T_{sp1}^*$. The control map 91 is set in advance through, for example, an experiment, based on, for example, the required steering characteristics. Note that the steering frequency $f_{rev}$ means an input frequency of the target pinion angle $\theta_p^*$.

As indicated in a graph in FIG. 5, when the steering frequency $f_{rev}$ and the first correction spring reactive torque $T_{sp1}^*$ are respectively plotted on the abscissa axis and the ordinate axis, the control map 91 has the following characteristics. As the steering frequency $f_{rev}$ increases, the absolute value of the first correction spring reactive torque $T_{sp1}^*$ is set to a larger value. After the steering frequency $f_{rev}$ reaches a prescribed value, the absolute value of the first correction spring reactive torque $T_{sp1}^*$ is maintained at a constant value, irrespective of the steering frequency $f_{rev}$.

The first vehicle reactive force model 81 computes a second correction spring reactive torque $T_{sp2}^*$. The second correction spring reactive torque $T_{sp2}^*$ is an elasticity component for maintaining the absolute value of a third correction spring reactive torque $T_{sp3}^*$ computed by the second vehicle reactive force model 82 (described later) constant, irrespective of the steering frequency $f_{rev}$. The first vehicle reactive force model 81 computes the second correction spring reactive torque $T_{sp2}^*$ corresponding to the steering frequency $f_{rev}$ based on a control map 92 that defines a relationship between the steering frequency $f_{rev}$ and the second correction spring reactive torque $T_{sp2}^*$, for each prescribed vehicle speed range. The control map 92 is set in advance through, for example, an experiment, based on, for example, the required steering characteristics.

Figure 6:
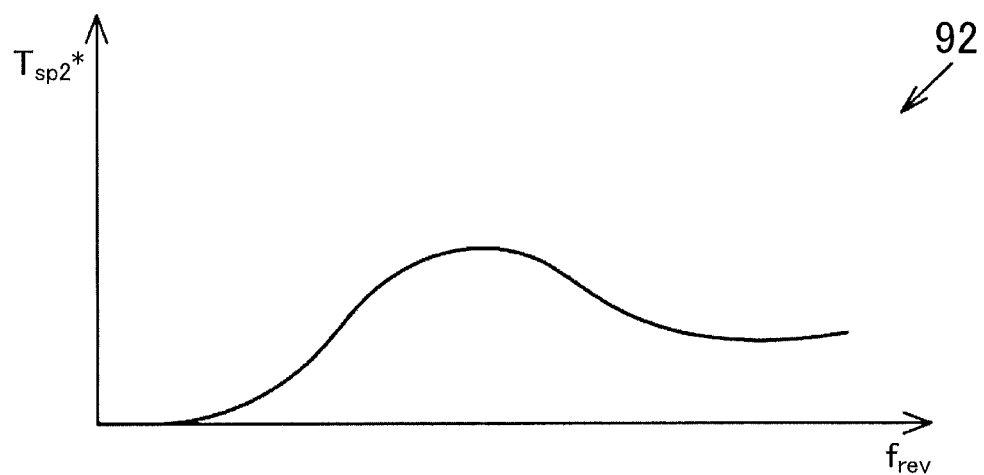
FIG. 6 is a graph indicating the relationship between a second correction spring reactive torque that is a correction component for the first correction spring reactive torque computed by the first vehicle reactive force model, and the steering frequency in the embodiment.

As indicated in a graph in FIG. 6, when the steering frequency $f_{rev}$ and the second correction spring reactive torque $T_{sp2}^*$ are respectively plotted on the abscissa axis and the ordinate axis, the control map 92 has the following characteristics. As the steering frequency $f_{rev}$ increases, the absolute value of the second correction spring reactive torque $T_{sp2}^*$ gradually becomes larger. When the steering frequency $f_{rev}$ further increases, the absolute value of the second correction spring reactive torque $T_{sp2}^*$ decreases gradually as the steering frequency $f_{rev}$ increases.

The second vehicle reactive force model 82 computes the third correction spring reactive torque $T_{sp3}^*$. The third correction spring reactive torque $T_{sp3}^*$ is a steering reactive force component (reactive force component that should be applied to the steering wheel 21) corresponding to the lateral acceleration LA applied to the vehicle, and has characteristics similar to those of an actual reactive force generated in the vehicle.

The third correction spring reactive torque $T_{sp3}^*$ is theoretically obtained according to Expression (B).

$$T_{sp3}^* = (\zeta/ln) \cdot (I/l) \cdot (lr \cdot m \cdot LA + I \cdot \gamma') \tag{B}$$

where:
$\zeta$ is an amount of trail;
ln is a length of a knuckle arm;
I is a yaw inertia moment applied to vehicle;
l is a wheelbase;
lr is a distance between a front wheel shaft and the center of gravity of the vehicle when the vehicle is seen from the side;
m is a weight of the vehicle;
LA is a lateral acceleration applied to the vehicle; and
$\gamma'$ is a yaw angular acceleration.

The third correction spring reactive torque $T_{sp3}^*$ can be computed according to Expression (B). However, in the present embodiment, the third correction spring reactive torque $T_{sp3}^*$ is computed according to Expression (C) that is formulated by omitting the term $I \cdot \gamma'$ from Expression (B). This is because a value of the term $I \cdot \gamma'$ in Expression (B) may be influenced by noise.

$$T_{sp3}^* = (\zeta/ln) \cdot (I/l) \cdot (lr \cdot m \cdot LA) \tag{C}$$

Thus, the second vehicle reactive force model 82 is able to compute the third correction spring reactive torque $T_{sp3}^*$ by applying the lateral acceleration LA acquired from the lateral acceleration sensor 440 to Expression (C).

The relationship between the third correction spring reactive torque $T_{sp3}^*$ computed according to Expression (C) and the steering frequency $f_{rev}$ has the following characteristics. As indicated in a graph in FIG. 7, when the steering frequency $f_{rev}$ and the third correction spring reactive torque $T_{sp3}^*$ are respectively plotted on the abscissa axis and the ordinate axis, the absolute value of the third correction spring reactive torque $T_{sp3}^*$ decreases gradually as the steering frequency $f_{rev}$ increases. When the steering frequency $f_{rev}$ further increases, the absolute value of the third correction spring reactive torque $T_{sp3}^*$ increases gradually with the increase in the steering frequency $f_{rev}$. That is, when the third correction spring reactive torque $T_{sp3}^*$ is computed based on the lateral acceleration LA, the third correction spring reactive torque $T_{sp3}^*$ drops as the steering frequency $f_{rev}$ increases. The reason why such a drop occurs is as follows.

When the steering wheel 21 is turned slowly by a large amount (when the steering frequency $f_{rev}$ is low), the vehicle turns gradually. Thus, the lateral acceleration LA is likely to be applied to the vehicle. In contrast to this, when the steering wheel 21 is quickly turned (when the steering frequency $f_{rev}$ is high), the vehicle does not turn by a large amount. Thus, the lateral acceleration LA is less likely to be applied to the vehicle. Therefore, when the steering frequency $f_{rev}$ is low, the value of the lateral acceleration LA is large. On the other hand, when the steering frequency $f_{rev}$ is high, the value of the lateral acceleration LA is low. As can be understood from Expression (B), the value of the third correction spring reactive torque $T_{sp3}^*$ is proportional to the value of the lateral acceleration LA. Thus, in a region where the steering frequency $f_{rev}$ is low, the value of the lateral acceleration LA is large and thus the value of the third correction spring reactive torque $T_{sp3}^*$ is likely to be large. On the other hand, in a region where the steering frequency $f_{rev}$ is high, the value of the lateral acceleration LA is small and thus the value of the third correction spring reactive torque $T_{sp3}^*$ is likely to be small.

Figure 7:
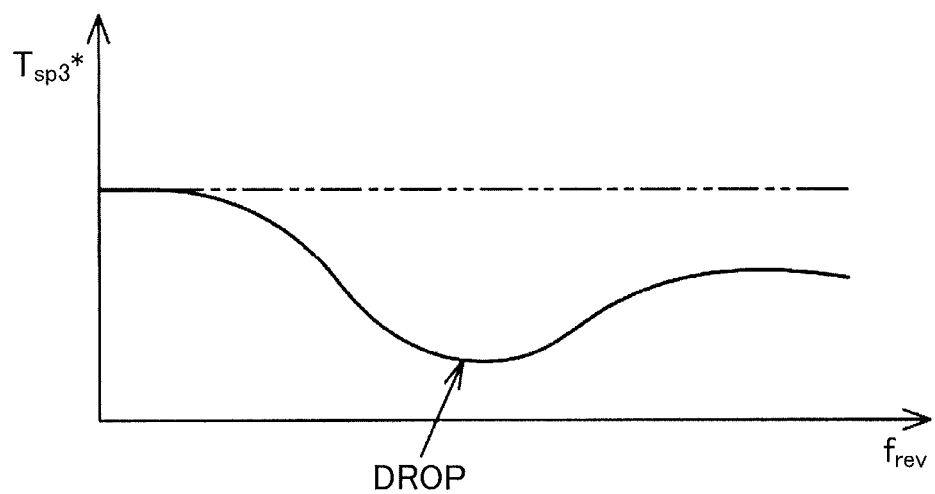
FIG. 7 is a graph indicating the relationship between a third correction spring reactive torque generated by a second vehicle reactive force model and the steering frequency.

The first vehicle reactive force model 81 computes the second correction spring reactive torque $T_{sp2}^*$ that is an elastic component for making a correction for eliminating the drop in the third correction spring reactive torque $T_{sp3}^*$ with respect to the steering frequency $f_{rev}$ indicated in the graph in FIG. 7, based on the control map 92 illustrated FIG. 6. In the present embodiment, the value obtained by adding the second correction spring reactive torque $T_{sp2}^*$ to the third correction spring reactive torque $T_{sp3}^*$ is the largest value among the absolute values of the third correction spring reactive torque $T_{sp3}^*$, and is always maintained constant. This is because the control map 92 is set in such a manner that such a second correction spring reactive torque $T_{sp2}^*$ is obtained.

As illustrated in FIG. 4, the distribution gain computing unit 83 computes a distribution gain G with the use of gain map 93 possessed by the distribution gain computing unit 83. The gain map 93 is a three-dimensional map that defines a relationship between the later acceleration LA and the distribution gain G for each vehicle speed V (or each vehicle speed range). The distribution gain G is used to determine a usage ratio between the third correction spring reactive torque $T_{sp3}*$ and the basic spring reactive torque $T_{sp0}*$ (ratio between the third correction spring reactive torque $T_{sp3}*$ and the basic spring reactive torque $T_{sp0}*$).

Figure 9:
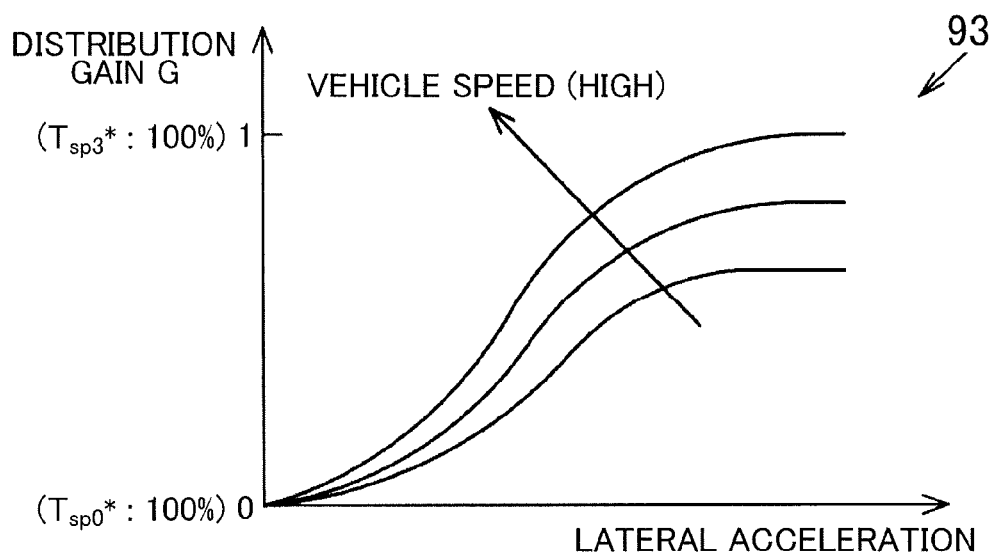
FIG. 9 is a graph indicating a gain map possessed by a distribution gain computing unit.

As indicated in a graph in FIG. 9, when the lateral acceleration LA and the distribution gain G are respectively plotted on the abscissa axis and the ordinate axis, the gain map 93 has the following characteristics. The distribution gain G is set to a larger value as the lateral acceleration LA becomes higher, or as the vehicle speed V becomes higher. On the other hand, the distribution gain G is set to a smaller value as the lateral acceleration LA becomes lower, or as the vehicle speed V becomes lower.

The correction computing unit 84 corrects the third correction spring reactive torque $T_{sp3}*$ computed by the second vehicle reactive force model 82, with the second correction spring reactive torque $T_{sp2}*$ computed by the first vehicle reactive force model 81. The corrected third correction spring reactive torque $T_{sp3}*$ is a final steering reactive force component (a reactive force component that should be applied to the steering wheel 21) corresponding to the lateral acceleration LA applied to the vehicle.

For example, when the third correction spring reactive torque $T_{sp3}*$ computed by the second vehicle reactive force model 82 has the characteristics indicated in the graph in FIG. 7, the second correction spring reactive torque $T_{sp2}*$ computed by the first vehicle reactive force model 81 (more specifically, the control map 92) has the characteristics as indicated in the graph in FIG. 6. The reason for this is as follows.

The third correction spring reactive torque $T_{sp3}*$ computed by the second vehicle reactive force model 82 is unequivocally determined based on the lateral acceleration LA. Thus, it is possible to obtain, from simulation, the second correction spring reactive torque $T_{sp2}*$ that is required to make a change in the third correction spring reactive torque $T_{sp3}*$ based on the lateral acceleration LA, with respect to the steering frequency $f_{rev}$ constant. It is also possible to obtain, from simulation, a correlation between the target pinion angle $\theta_p*$ of the moment and the lateral acceleration LA applied to the vehicle. Thus, the correction computing unit 84 may have the required second correction spring reactive torque $T_{sp2}*$ in association with a value (or a range of values) of the target pinion angle $\theta_p*$ of the moment. Thus, the correction computing unit 84 is able to unequivocally compute, based on the target pinion angle $\theta_p*$ of the moment, the optimum second correction spring reactive torque $T_{sp2}*$ for making a change in the third correction spring reactive torque $T_{sp3}*$ of the moment with respect to the steering frequency $f_{rev}$ constant based on the target pinion angle $\theta_p*$.

The correction computing unit 84 adds the second correction spring reactive torque $T_{sp2}*$ having the characteristics indicated in the graph in FIG. 6 to, for example, the third correction spring reactive torque $T_{sp3}*$ indicated in FIG. 7. The corrected third correction spring reactive torque $T_{sp3}*$ obtained through the correction has the following characteristics.

Figure 8:
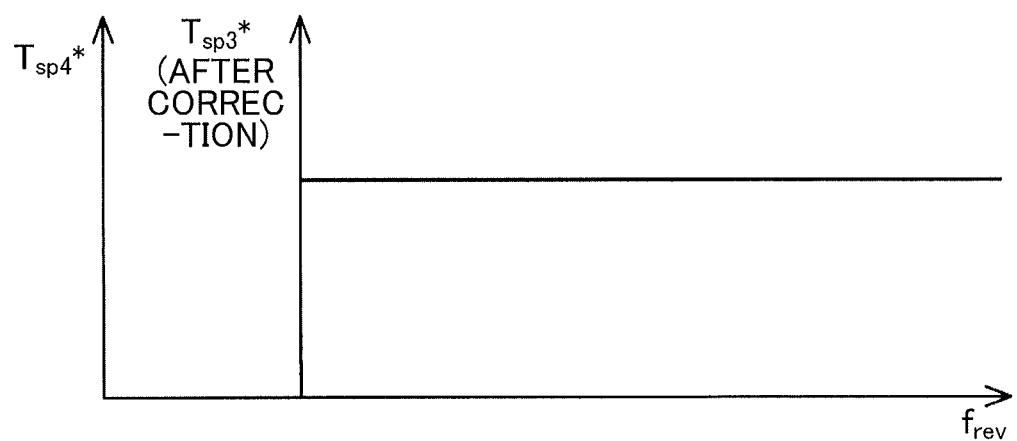
FIG. 8 is a graph indicating the relationship between the corrected third correction spring reactive torque corrected by a correction computing unit and the steering frequency.

As indicated in a graph in FIG. 8, a change in the absolute value of the corrected third correction spring reactive torque $T_{sp3}*$ with respect to the steering frequency $f_{rev}$ is maintained constant (theoretically, the gradient of the absolute value of the corrected third correction spring reactive torque $T_{sp3}*$ with respect to the steering frequency $f_{rev}$ is zero). That is, through the correction process executed by the correction computing unit 84, the drop in the third correction spring reactive torque $T_{sp3}*$ due to an increase in steering frequency $f_{rev}$ is eliminated.

The interpolation computing unit 85 determines the usage ratio between the corrected third correction spring reactive torque $T_{sp3}*$ and the basic spring reactive torque $T_{sp0}*$ with the use of the distribution gain G computed by the distribution gain computing unit 83.

As described above, the distribution gain G is set to a value within a range from "zero" to "one". When the distribution gain G is "zero", the interpolation computing unit 85 sets the usage ratio of the basic spring reactive torque $T_{sp0}*$ (the ratio of the basic spring reactive torque $T_{sp0}*$ to the sum of the basic spring reactive torque $T_{sp0}*$ and the third correction spring reactive torque $T_{sp3}*$) to 100%. When the distribution gain G is "one", the interpolation computing unit 85 sets the usage ratio of the third correction spring reactive torque $T_{sp3}*$ (the ratio of the third correction spring reactive torque $T_{sp3}*$ to the sum of the basic spring reactive torque $T_{sp0}*$ and the third correction spring reactive torque $T_{sp3}*$) to 100%. The usage ratio between the basic spring reactive torque $T_{sp0}*$ and the third correction spring reactive torque $T_{sp3}*$ is adjusted based on the value of the distribution gain G.

As illustrated in a graph in FIG. 9, the value of the distribution gain G is set to a larger value, as the lateral acceleration LA becomes higher, or as the vehicle speed V becomes higher. Thus, as the lateral acceleration LA applied to the vehicle becomes higher, or as the vehicle speed V becomes higher, the usage ratio of the third correction spring reactive torque $T_{sp3}*$ becomes higher and the usage ratio of the basic spring reactive torque $T_{sp0}*$ becomes lower. On the other hand, as the lateral acceleration LA becomes lower, or as the vehicle speed V becomes lower, the value of the distribution gain G is set to a smaller value. Thus, as the lateral acceleration LA applied to the vehicle becomes lower, or as the vehicle speed V becomes lower, the usage ratio of the third correction spring reactive torque $T_{sp3}*$ becomes lower and the usage ratio of the basic spring reactive torque $T_{sp0}*$ becomes higher.

The interpolation computing unit 85 computes a fourth correction spring reactive torque $T_{sp4}*$ by adding together the basic spring reactive torque $T_{sp0}*$ and the corrected third correction spring reactive torque $T_{sp3}*$, the usage ratio between the basic spring reactive torque $T_{sp0}*$ and the corrected third correction spring reactive torque $T_{sp3}*$ having been adjusted. The basic spring reactive torque $T_{sp0}*$ has the same characteristics as those of the corrected third correction spring reactive torque $T_{sp3}*$ indicated in FIG. 8. That is, a change in the absolute value of the basic spring reactive torque $T_{sp0}*$ with respect to the steering frequency $f_{rev}$ is maintained constant (theoretically, the gradient of the absolute value of the basic spring reactive torque $T_{sp0}*$ with respect to the steering frequency $f_{rev}$ is zero). The absolute value of the fourth correction spring reactive torque $T_{sp4}*$, which is obtained by adding together the basic spring reactive torque $T_{sp0}*$ and the third correction spring reactive torque $T_{sp3}*$, with respect to a change in the steering frequency $f_{rev}$ is also maintained constant.

For example, when the distribution gain G is "one", the usage ratio of the corrected third correction spring reaction torque $T_{sp3}*$ is 100%, and the usage ratio of the fundamental spring reaction torque $T_{sp0}*$ is 0%. The interpolation computing unit 85 adds substantially nothing to the corrected third correction spring reaction torque Tsp3* having the characteristics indicated in the graph in FIG. 8. Thus, the interpolation computing unit 85 computes the fourth correction spring reaction torque Tsp4* having the same characteristics as those of the corrected third correction spring reaction torque Tsp3* indicated in the graph in FIG. 8.

As illustrated in FIG. 4, the adder 86 adds together the fourth correction spring reactive torque $T_{sp4}*$ computed by the interpolation computing unit 85 and the first correction spring reactive torque $T_{sp1}*$ computed by the first vehicle reactive force model 81 (specifically, the control map 91). Thus, the final spring component $T_{sp}*$ of the basic drive torque $T_p*$ is computed.

The case where the distribution gain G is "one" will be described. As described above, when the distribution gain G is "one", the fourth correction spring reactive torque $T_{sp4}*$ has the same characteristics as those of the corrected third correction spring reactive torque $T_{sp3}*$ as indicated in the graph in FIG. 8. Thus, the final spring component $T_{sp}*$ computed by the adder 86 has the same characteristics as those obtained by adding together the characteristics of the corrected third correction spring reactive torque $T_{sp3}*$ indicated in the graph in FIG. 8 and the characteristics of the first correction spring reactive torque $T_{sp1}*$ indicated in the graph in FIG. 5.

Figure 10:
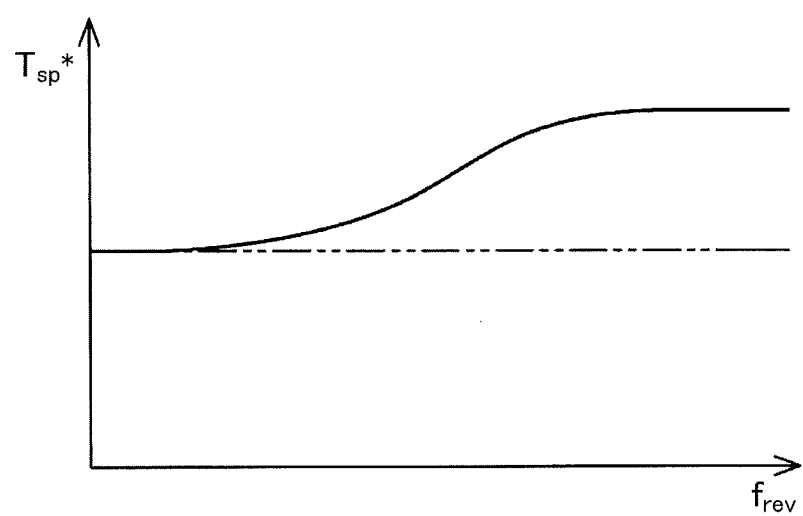
FIG. 10 is a graph indicating the relationship between a finally-required spring component of a basic drive torque and the steering frequency.

As illustrated in a graph in FIG. 10, when the steering frequency $f_{rev}$ and the spring component $T_{sp}*$ of the basic drive torque $T_p*$ are respectively plotted on the abscissa axis and the ordinate axis, the spring component $T_{sp}*$ has the following characteristics. As the steering frequency $f_{rev}$ increases, the spring component $T_{sp}*$ increases gradually. After the steering frequency $f_{rev}$ reaches a prescribed value, the spring component $T_{sp}*$ is maintained at a constant value.

Even when the distribution gain G is a value other than "one", the final target spring component $T_{sp}*$ is obtained as described above. When the distribution gain G is a value between "zero" and "one", the basic spring reactive torque $T_{sp0}*$ and the corrected third correction spring reactive torque $T_{sp3}*$ are added together at a prescribed usage ratio therebetween. A change in the absolute value of the basic spring reactive torque $T_{sp0}*$ with respect to the steering frequency $f_{rev}$ is maintained constant (theoretically, spring the gradient of the absolute value of the basic ng reactive torque $T_{sp0}*$ with respect to the steering frequency $f_{rev}$ is zero). Thus, a change in the fourth correction spring reactive torque $T_{sp4}*$, which is obtained by adding together the basic spring reactive torque $T_{sp0*}$ and the corrected third correction spring reactive torque $T_{sp3}*$, with respect to the steering frequency $f_{rev}$ is maintained constant. Note that, a change in each of the basic spring reactive torque $T_{sp0}*$ and the corrected third correction spring reactive torque $T_{sp3}*$ with respect to the steering frequency $f_{rev}$ is maintained constant. As described above, by adding the first correction spring reactive torque $T_{sp1}*$ to the fourth correction spring reactive torque $T_{sp4}*$, the same characteristics as those indicated in the graph in FIG. 10 are obtained.

The operation of the ideal vehicle model 72 configured as described above will be described. As described above, in the present embodiment, not only the target pinion angle $\theta_p*$ but also the lateral acceleration LA is taken into account in computing the spring component $T_{sp}*$. In a process of computing the final spring component $T_{sp}*$, various correction processes are executed. Among these correction processes, a basic operation in the present embodiment will be described. The various correction processes include three processes described in (a), (b), (c) below. However, descriptions on the correction processes will be described.

(a) A correction process executed by the correction computing unit 84 with the use of the second correction spring reactive torque $T_{sp2}*$ (b) A correction process executed by the interpolation computing unit 85 with the use of the distribution gain G (c) A correction process executed by the adder 86 with the use of the first correction spring reactive torque $T_{sp1}*$ Basically, the ideal vehicle model 72 computes the spring component $T_{sp}*$ on the basis of the result obtained by adding the third correction spring reactive torque $T_{sp3}*$ based on the lateral acceleration LA to the basic spring reactive torque $T_{sp0}*$ based on the target pinion angle $\theta_p*$. As a result, the spring component $T_{sp}*$ becomes a value that reflects the lateral acceleration LA. The value of the spring component $T_{sp}*$ is larger than that when the spring component $T_{sp}*$ is computed based on only the target pinion angle $\theta_p*$, by an amount corresponding to the corrected third correction spring reactive torque $T_{sp3}*$ that is added to the basic spring reactive torque $T_{sp0}*$.

Thus, the subtractor 74 in the ideal EPS model 71 subtracts the spring component $T_{sp}*$, which has been increased by an amount corresponding to the third correction spring reactive torque $T_{sp3}*$, from the basic drive torque $T_p*$. That is, the subtraction value $T_p**$ computed by the subtractor 74 becomes a value that is smaller by an amount corresponding to the third correction spring reactive torque $T_{sp3}*$.

As expressed in Expression (C), the third correction spring reactive torque $T_{sp3}*$ becomes a value corresponding to the lateral acceleration LA. As can be understood from Expression (C), the third correction spring reactive torque $T_{sp3}*$ is regarded as an integer multiple of the lateral acceleration LA, and thus the value of the third correction spring reactive torque $T_{sp3}*$ increases as the lateral acceleration LA increases. As the value of the third correction spring reactive torque $T_{sp3}*$ increases, the value of the subtraction value $T_p**$ decreases and the value of the target pinion angle $\theta_p*$, which is computed through the use of the inertia model 75, the first integrator 76, and the second integrator 77 based on the subtraction value $T_p**$, decreases.

The correction component $T_{a2}*$ computed by the pinion angle feedback controller 63 also decreases based on an amount of decrease in the target pinion angle $\theta_p*$. By an amount of decrease in the value of the correction component $T_{a2}*$ that is added to the basic assist component $T_{a1}*$, the value of the assist command value $T_a*$ decreases, and the value of the current command value I* decreases. By an amount of decrease in the value of the current command value I*, the motor torque generated by the motor 31 decreases, and the steering assist force that is applied to the steering wheel 21 decreases. That is, the steering reactive force that the driver senses from the steering wheel 21 increases. As the steering reactive force increases based on the magnitude of the lateral acceleration LA, a harmonious balance between the lateral acceleration LA sensed by the driver's body and the response (steering reactive force) that the driver senses at his/her hands from the steering wheel 21 is more likely to be maintained. Thus, even when a high lateral acceleration LA is applied to the vehicle, the driver is more likely to feel a sense of unity with the vehicle.

Next, a process of suppressing generation of a steering insufficient feel will be described. As illustrated in FIG. 7, it is deemed that a so-called drop will occur in the third correction spring reactive torque $T_{sp3}*$ computed based on the lateral acceleration LA, as the steering frequency $f_{rev}$ increases. This is because, the value of the lateral acceleration LA is high when the steering frequency $f_{rev}$ is low, whereas the lateral acceleration LA is low when the steering frequency $f_{rev}$ is high. As can be understood from Expression (B), the value of the third correct on spring reactive torque $T_{sp3}*$ is proportional to the value of the lateral acceleration LA. Thus, in the region where the steering frequency $f_{rev}$ is low, the value of the lateral acceleration LA is likely to be high and thus the value of the third correction spring reactive torque $T_{sp3}^*$ is likely to be high. In the region where the steering frequency $f_{rev}$ is high, the value of the lateral acceleration LA is likely to be low and thus the value the third correction spring reactive torque $T_{sp3}^*$ is likely to be low. When the third correction spring reactive torque $T_{sp3}^*$ is insufficient, a sufficient steering reactive force corresponding to the lateral acceleration LA is not obtained. Thus, there is a possibility that the driver will feel a so-called steering insufficient feel.

In the present embodiment, a shortage in the third correction spring reactive torque $T_{sp3}^*$ is compensated for by the second correction spring reactive torque $T_{sp2}^*$ that is an additional elasticity component. For example, the second correction spring reactive torque $T_{sp2}^*$ indicated in the graph in FIG. 6 is added to the third correction spring reactive torque $T_{sp3}^*$ as indicated in the graph in FIG. 7. Through this addition, it is possible to obtain the constant third correction spring reactive torque $T_{sp3}^*$ irrespective of the steering frequency $f_{rev}$. Thus, it is possible to suppress generation of a so-called steering insufficient feel. It is also possible to stably obtain a steering reactive force corresponding to the magnitude of the lateral acceleration LA.

Next, a process of distributing the correction spring reactive torque will be described. As described above, depending on the travelling conditions of the vehicle, the driver's sense of unity with the vehicle is required to improve in some cases, but the driver's sense of unity with the vehicle is not required to improve so much in the other cases. For example, as the lateral acceleration LA increases, the driver's sense of unity with the vehicle is required to improve. On the other hand, as the lateral acceleration LA decreases, the possibility that the driver's sense of unity with the vehicle will cause a problem becomes lower. In the present embodiment, in order to deal with such situations, the usage ratio between the third correction spring reactive torque $T_{sp3}^*$ and the basic spring reactive torque $T_{sp0}^*$ is adjusted depending on the vehicle conditions. The usage ratio is adjusted based on the distribution gain G computed by the distribution gain computing unit 83.

For example, as the lateral acceleration LA increases, the usage ratio of the third correction spring reactive torque $T_{sp3}^*$ is increased, and the usage ratio of the basic spring reactive torque $T_{sp0}^*$ is decreased. On the other hand, as the lateral acceleration LA decreases, the usage ratio of the third correction spring reactive torque $T_{sp3}^*$ is decreased, and the usage ratio of the basic spring reactive torque $T_{sp0}^*$ is increased.

The basic spring reactive torque $T_{sp0}^*$ based on the target pinion angle $\theta_p^*$ contributes to a so-called rigid steering feel. The third correction spring reactive torque $T_{sp3}^*$ based on the lateral acceleration LA contributes to a driver's sense of unity with the vehicle. Thus, by adjusting the usage ratio between the third correction spring reactive torque $T_{sp3}^*$ based on the lateral acceleration LA and the basic spring reactive torque $T_{sp0}^*$, it is possible to appropriately obtain a rigid steering feel and a driver's sense of unity with the vehicle on the basis of the vehicle travelling conditions of the moment. Because a harmonious balance between a rigid steering feel and a driver's sense of unity with the vehicle is maintained, the ease in driving the vehicle is improved.

As described above, the fourth correction spring reactive torque $T_{sp4}^*$, which is obtained by adding together the basic spring reactive torque $T_{sp0}^*$ and the third correction spring reactive torque $T_{sp3}^*$, is a value that is constant with respect to a change in the steering frequency $f_{rev}$. Note that, the usage ratio between the basic spring reactive torque $T_{sp0}^*$ and the third correction spring reactive torque $T_{sp3}^*$ has been adjusted. The fourth correction spring reactive torque $T_{sp4}^*$ can be. The fourth correction spring reactive torque $T_{sp4}^*$ may be used as the final spring component $T_{sp}^*$ of the basic drive torque $T_p^*$, but the requested final characteristics of a steering reactive force vary depending on, for example, the types of vehicles. In the present embodiment, the final spring component $T_{sp}^*$ is obtained by adding the first correction spring reactive torque $T_{sp1}^*$ to the fourth correction spring reactive torque $T_{sp4}^*$. It is possible to obtain the desired spring component $T_{sp}^*$ by appropriately setting the first correction spring reactive torque $T_{sp1}^*$ that is added to the fourth correction spring reactive torque $T_{sp4}^*$ that is a value constant with respect to a change in the steering frequency $f_{rev}$. Consequently, it is possible to reliably obtain the finally required characteristics of a steering reactive force.

When the lateral acceleration LA applied to the vehicle is low, for example, when the vehicle approaches a curve, a rigid steering feel has a higher priority than a driver's sense of unity with the vehicle. Thus, the usage ratio of the third correction spring reactive torque $T_{sp3}^*$ that contributes to a driver's sense of unity with the vehicle is decreased, whereas the usage ratio of the basic spring reactive torque $T_{sp0}^*$ that contributes to a rigid steering feel is increased. As a result, the rigid steering feel is likely to be transmitted to the driver's hands, as the response. Thus, for example, as the vehicle approaches a curve, the driver is able to sense a clear steering response from the steering wheel 21 at his/her hands. Further, the vehicle is more likely to directly react to a steering operation, the driver is able to perform a steering wheel 21 more accurately.

When the steering wheel 21 is turned as the vehicle enters a curve, the lateral acceleration LA increases based on the amount of steering operation. When a driver's sense of unity with the vehicle is required be improved as the lateral acceleration LA increases, the usage ratio of the third correction spring reactive torque $T_{sp3}^*$ that contributes to a driver's sense of unity with the vehicle is increased, whereas the usage ratio of the basic spring reactive torque $T_{sp0}^*$ that contributes to a rigid steering feel is decreased. As a result, the steering response sensed by the driver's hands increases as the lateral acceleration LA increases. When the vehicle exits the curve, the lateral acceleration LA decreases as the steering wheel 21 is turned in a reverse direction. As a result, the steering response sensed by the driver's hands decreases with a decrease in the usage ratio of the third correction spring reactive torque $T_{sp3}^*$ that contributes to a driver's sense of unity with the vehicle. As described above, when the vehicle is travelling on, for example, a curve, the motion of the vehicle (the lateral acceleration LA sensed by the driver's body) and the steering response sensed by the driver's hands match each other. Thus, the driver's ease in driving the vehicle improves.

In the present embodiment, the following advantageous effects are obtained. The basic assist component $T_{a1}^*$ is corrected with the correction component $T_{a2}^*$ on the basis of an increase in the lateral acceleration LA applied to the vehicle. The steering reactive force is increased through the correction. An increase in the magnitude of the basic drive torque $T_p^*$ (the sum of the basic assist component $T_{a1}^*$ and the steering torque $T_h$) used to compute the target pinion angle $\theta_p^*$ is suppressed. Then, the correction component $T_{a2}^*$ is obtained through the feedback control for causing the actual pinion angle $\theta_p$ to follow the target pinion angle $\theta_p^*$ that is computed based on the basic drive torque $T_p^*$ that is restrained from increasing. By an amount corresponding to suppression in an increase in the magnitude of the basic drive torque $T_p^*$, the target pinion angle $\theta_p^*$ computed by the target pinion angle computing unit 62 is decreased, and the correction component $T_{a2}^*$ for the basic assist component $T_{a1}^*$ is decreased. By an amount of decrease in the correction component $T_{a2}^*$, the steering assist force that is applied to the steering mechanism 20 is decreased. As a result, the steering reactive force increases with a decrease in the steering assist force. Thus, it is possible to obtain an appropriate steering reactive force based on the magnitude of the lateral acceleration LA. It is possible to maintain a harmonious balance between the lateral acceleration LA sensed by the driver's body and the steering reactive force, that is, the response that the driver senses at his/her hands from the steering wheel 21.

The second vehicle reactive force model 82 computes the third correction spring reactive torque $T_{sp3}^*$ to increase the elasticity component included in a steering reactive force with an increase in the lateral acceleration LA. The target pinion angle computing unit 62 computes the target pinion angle $\theta_p^*$ based on the basic drive torque $T_p^*$ (the subtraction value $T_p^{**}$) the magnitude of which is suppressed by an amount corresponding to the third correction spring reactive torque $T_{sp3}^*$. The pinion angle feedback controller 63 computes the correction component $T_{a2}^*$ through the feedback control for causing the actual pinion angle $\theta_p$ to follow the target pinion angle $\theta_p^*$ computed by the target pinion angle computing unit 62. Through the correction of the basic assist component $T_{a1}^*$ with the correction component $T_{a2}^*$, the elasticity component included in the steering reactive force increases. Because the elasticity component included in the steering reactive force increases with an increase in the lateral acceleration LA, it is possible to maintain a harmonious balance between the lateral acceleration LA sensed by the driver's body and the steering reactive force, that is, the response that the driver senses at his/her hands from the steering wheel 21.

The first vehicle reactive force model 81 computes the second correction spring reactive torque $T_{sp2}^*$ to maintain the magnitude of the third correction spring reactive torque $T_{sp3}^*$ with respect to a change in the steering frequency $f_{rev}$ constant. The reason for this is as follows. The third correction spring reactive torque $T_{sp3}^*$ that is computed based on the lateral acceleration LA changes based on the steering frequency $f_{rev}$. For example, as the steering frequency $f_{rev}$ increases, the lateral acceleration LA is less likely to be applied to the vehicle, and thus, there is a possibility that the required third correction spring reactive torque $T_{sp3}^*$ will not be obtained. In this case, a sufficient steering reactive force is not obtained, and thus the driver will feel a so-called steering insufficient feel. Thus, a shortage in the third correction spring reactive torque $T_{sp3}^*$ is compensated for by the second correction spring reactive torque $T_{sp2}^*$, and it is thus possible to obtain the constant third correction spring reactive torque $T_{sp3}^*$, irrespective of the steering frequency $f_{rev}$. It is possible to stably obtain a steering reactive force corresponding to the magnitude of the lateral acceleration LA. It is also possible to suppress generation of a so-called steering insufficient feel.

The basic spring reactive torque $T_{sp0}^*$ based on the target pinion angle $\theta_p^*$ contributes to a so-called rigid steering feel. The third correction spring reactive torque $T_{sp3}^*$ based on the lateral acceleration LA contributes to a driver's sense of unity with the vehicle. Therefore, by adjusting the usage ratio between the basic spring reactive torque $T_{sp0}^*$ and the third correction spring reactive torque $T_{sp3}^*$ based on the lateral acceleration LA, it is possible to appropriately obtain a rigid steering feel and a driver's sense of unity with the vehicle. For example, a driver's sense of unity with the vehicle will be more insufficient as the lateral acceleration LA increases, and thus the usage ratio of the third correction spring reactive torque $T_{sp3}^*$ is increased. Thus, it is possible to appropriately obtain a driver's sense of unity with the vehicle based on the magnitude of the lateral acceleration LA.

The first vehicle reactive force model 81 further computes the first correction spring reactive torque $T_{sp1}^*$ for the fourth correction spring reactive torque $T_{sp4}^*$, the magnitude of which is constant with respect to a change in the steering frequency $f_{rev}$, in order to obtain the target spring component $T_{sp}^*$. Thus, it is possible to obtain the spring component $T_{sp}^*$ having desired characteristics by appropriately setting the first correction spring reactive torque $T_{sp1}^*$.

The following modifications may be made to the above-described embodiment. As illustrated in FIG. 11, the ideal vehicle model 72 may include a third vehicle reactive force model 101. In this case, as indicated by two-dotted lines in FIG. 1 and FIG. 2, the electric power steering system 10 includes a yaw rate sensor 450. As illustrated in FIG. 11, the ideal vehicle model 72 includes an additional interpolation computing unit 102. The distribution gain computing unit 83 includes an additional gain map 103.

The third vehicle reactive force model 101 computes a fifth correction spring reactive torque $T_{sp5}^*$. The fifth correction spring reactive torque $T_{sp5}^*$ is a steering reactive force component (reactive force component that should be applied to the steering wheel 21) corresponding to the yaw rate YR applied to the vehicle.

The fifth correction spring reactive torque $T_{sp5}^*$ is theoretically computed according to Expression (D).

$$T_{sp5}^* = (\zeta/ln) \cdot (I/ln) \cdot (lr \cdot m \cdot V \cdot \gamma + I \cdot \gamma') \qquad (D)$$

where:
$\zeta$ is an amount of trail;
ln is a length of a knuckle arm;
I is a yaw inertia moment applied to vehicle;
l is a wheelbase;
lr is a distance between a front wheel shaft and the center of gravity of the vehicle when the vehicle is seen from the side;
m is a weight of the vehicle;
V is a vehicle speed;
$\gamma$ is a yaw rate; and
$\gamma'$ is a yaw angular acceleration.

The third vehicle model 101 is able to compute the fifth correction spring reactive torque $T_{sp5}^*$ by applying the yaw rate acquired by the yaw rate sensor 450 to Expression (D). Note that, the fifth correction spring reactive torque $T_{sp5}^*$ may be computed according to an expression that is obtained by omitting the term "$I \cdot \gamma'$" from Expression (D).

The distribution gain computing unit 83 sets the usage ratio between the third correction spring reactive torque $T_{sp3}^*$ and the fifth correction spring reactive torque $T_{sp5}^*$ with the use of the additional gain map 103. When the lateral acceleration LA is high, the distribution gain computing unit 83 increases the usage ratio of the third correction spring reactive torque $T_{sp3}^*$ based on the lateral acceleration LA, and decreases the usage ratio of the fifth correction spring reactive torque $T_{sp5}^*$ based on the yaw rate YR. On the other hand, when the lateral acceleration LA is low, the distribution gain computing unit 83 decreases the usage ratio of the third correction spring reactive torque $T_{sp3}^*$ based on the lateral acceleration LA, and increases the usage ratio of the fifth correction spring reactive torque $T_{sp5}^*$ based on the yaw rate YR.

The additional interpolation computing unit 102 computes a sixth correction spring reactive torque $T_{sp6}^*$ by adding together the third correction spring reactive torque $T_{sp3}^*$ and the fifth correction spring reactive torque $T_{sp5}^*$, the usage ratio between which has been adjusted. The correction computing unit 84 corrects the sixth correction spring reactive torque $T_{sp6}^*$ by adding the second correction spring reactive torque $T_{sp2}^*$ to the sixth correction spring reactive torque $T_{sp6}^*$. The second correction spring reactive torque $T_{sp2}^*$ is set in advance, for example, from simulation, such that the value of the sixth correction spring reactive torque $T_{sp6}^*$ with respect to the steering frequency $f_{rev}$ is maintained constant. The remaining processes are the same as those in the above-described embodiment.

The fifth correction spring reactive torque $T_{sp5}^*$ based on the yaw rate YR contributes to a so-called clear steering feel. Thus, by adjusting the usage ratio between the fifth correction spring reactive torque $T_{sp5}^*$ based on the yaw rate YR and the third correction spring reactive torque $T_{sp3}^*$ based on the lateral acceleration LA, it is possible to appropriately obtain the so-called clear steering feel and the driver's sense of unity with the vehicle. The steering reactive force based on the fifth correction spring reactive torque $T_{sp5}^*$ is computed based on the yaw rate YR applied to the vehicle. Taking the fifth correction spring reactive torque $T_{sp5}^*$ into account makes it possible to obtain a steering feel similar to that when a centrifugal force is applied to the vehicle.

In the above-described embodiment, the torque sensor 420 is disposed on the column shaft 22a. However, the torque sensor 420 may be disposed on the intermediate shaft 22b or the pinion shaft 22c. As long as the steering torque $T_h$ is detected, the torque sensor 420 may be disposed at any position of the steering mechanism 20.

In the above-described embodiment, the pinion angle feedback controller 63 executes PID control on the pinion angle $\theta_p$. However, the pinion angle feedback controller 63 may execute PI control on the pinion angle $\theta_p$. In the above-described embodiment, the feedback control is executed on the pinion angle $\theta_p$ corresponding to the steered angle $\theta_{ta}$ of the steered wheels 26. However, the feedback control may be executed on the rotation angle of the intermediate shaft 22b. Alternatively, the feedback control may be executed on the rotation angle of an output shaft of the motor 31. Because the rotation angle of each the intermediate shaft 22b and the output shaft of the motor 31 is a value that reflects the steered angle $\theta_{ta}$, the feedback control on the steered angle $\theta_{ta}$ is executed indirectly through the feedback control on the rotation angle. The steered angle $\theta_{ta}$ of the steered wheels 26 may be detected, and the feedback control may be directly executed on the detected steered angle $\theta_{ta}$. In this case, the target pinion angle computing unit 62 functions as a target steered angle computing unit, and the pinion angle feedback controller 63 functions as a steered angle feedback controller.

In the above-described embodiment, the ideal EPS model 71 computes the target pinion angle $\theta_p^*$ (ideal pinion angle) based on the sum of the basic assist component $T_{a1}^*$ and the steering torque $T_h$. However, the ideal EPS model 71 may compute the target pinion angle $\theta_p^*$ based on only the steering torque $T_h$.

In the above-described embodiment, the basic assist component computing unit 61 computes the basic assist component $T_{a1}^*$ based on the steering torque $T_h$ and the vehicle speed V. However, the basic assist component computing unit 61 may compute the basic assist component $T_{a1}^*$ based on only the steering torque $T_h$. The basic assist component computing unit 61 may execute at least one of phase compensation control and torque derivative control. In the phase compensation control, the phase of the steering torque $T_h$ detected by the torque sensor 420 may be changed based on an assist gradient. In the torque derivative control, it is preferable that the value of the basic assist component $T_{a1}^*$ be increased as the differential value of the basic assist component $T_{a1}^*$ increases.

In the above-described embodiment, the usage ratio between the basic spring reactive torque $T_{sp0}^*$ and the third correction spring reactive torque $T_{sp3}^*$ is adjusted based on the lateral acceleration LA. However, the adjustment need not be made. In this case, the distribution gain computing unit 83 may be omitted.

In the above-described embodiment, the first vehicle reactive force model 81 corrects the fourth correction spring reactive torque $T_{sp4}^*$ computed by the interpolation computing unit 85 with the use of the first correction spring reactive torque $T_{sp1}^*$ computed based on the control map 91. However, the correction process need not be executed. In this case, the control map 91 may be omitted.

In the above-described embodiment, the first vehicle reactive force model 81 corrects the third correction spring reactive torque $T_{sp3}^*$ computed by the second vehicle reactive force model 82 with the use of the second correction spring reactive torque $T_{sp2}^*$ computed based on the control map 92. However, the correction process need not be executed. In this case, the control map 92 may be omitted.

In the above-described embodiment, the invention is applied to the electric power steering system 10 that applies a steering assist force to the column shaft 22a. However, the invention may be applied to an electric power steering system that applies a steering assist force to, for example, the pinion shaft 22c or the rack shaft 23.

What is claimed is:

1. An electric power steering system comprising:
    a motor that is a source of generating steering assist force that is applied to a steering mechanism of a vehicle; and
    a controller that controls the motor in response to a vehicle steering operation, the controller including
        a first computing unit that computes a basic control component of the steering assist force to be applied to the steering mechanism based on at least a steering torque, and
        a second computing unit that computes a correction control component for the basic control component through feedback control for causing an actual rotation angle of a rotary shaft that rotates based on a steered angle of steered wheels to coincide with a target rotation angle computed based on at least the steering torque, wherein
    the second computing unit decreases at least a magnitude of the steering torque used to compute the target rotation angle and then computes the correction control component, to increase a steering reactive force with an increase in a lateral acceleration applied to the vehicle.

2. The electric power steering system according to claim 1, wherein the second computing unit computes an assist elasticity component to increase an elasticity component included in the steering reactive force with the increase in the lateral acceleration, and decreases at least the magnitude of the steering torque used to compute the target rotation angle based on the assist elasticity component.

3. The electric power steering system according to claim 2, wherein the second computing unit computes an additional elasticity component to maintain a magnitude of the assist elasticity component with respect to a change in a steering frequency constant.

4. The electric power steering system according to claim 3, wherein:
    the second computing unit computes a basic component of the assist elasticity component based on the target rotation angle, and an assist component for the basic component based on the lateral acceleration, and the second computing unit sets a usage ratio between the basic component and the assist component based on the magnitude of the lateral acceleration, and increases a usage ratio of the assist component with the increase in the lateral acceleration.

\* \* \* \* \*